United States Patent [19]

Pinkstaff

[11] 4,409,484
[45] Oct. 11, 1983

[54] BRAKE ASSEMBLY FOR ROTATABLE SCINTILLATION DETECTOR

[75] Inventor: Carlos D. Pinkstaff, Chardon, Ohio
[73] Assignee: Technicare Corporation, Solon, Ohio
[21] Appl. No.: 306,573
[22] Filed: Sep. 28, 1981
[51] Int. Cl.³ ............................................ G01T 1/166
[52] U.S. Cl. ............................. 250/363 S; 267/137
[58] Field of Search ................... 267/137, 136, 150; 378/197, 196, 117; 250/363 S

[56] References Cited

U.S. PATENT DOCUMENTS

| | | | |
|---|---|---|---|
| 3,891,856 | 6/1975 | Amor, Jr. et al. | 378/197 |
| 4,216,381 | 8/1980 | Lange | 250/363 S |
| 4,243,240 | 1/1981 | Shepherd, Sr. | 267/150 |

Primary Examiner—Alfred E. Smith
Assistant Examiner—Carolyn E. Fields
Attorney, Agent, or Firm—Michael A. Kaufman

[57] ABSTRACT

A brake mechanism for decelerating and positively stopping the support apparatus of a rotating scintillation detector subsequent to completion of a full 360° of rotation as needed for a tomographic study. There is provided a laterally deflectable striker member positioned between two shock absorbers. The support structure of the scintillation detector is either manually rotated or is motor driven by a gear which is provided with a laterally extending striker pin configured and arranged to rotate with said gear and deflect the striker member in a lateral direction as the gear is completing its rotation in either the clockwise or counterclockwise direction. Once the striker pin engages the striker, the striker is deflected either to the right or to the left depending on whether the gear is rotating in a clockwise or counterclockwise direction. In either direction, the striker contacts one of the shock absorbers which serves to decelerate the rotating mass and safely slow it down.

There is also provided a pair of limit switches either of which when actuated will decouple the motor from the gear to bring the rotating apparatus to a complete halt. Actuation of a limit switch is accomplished whenever the detector is motor driven and the striker is advanced to within a preselected position relative to one of the shock absorbers.

8 Claims, 5 Drawing Figures

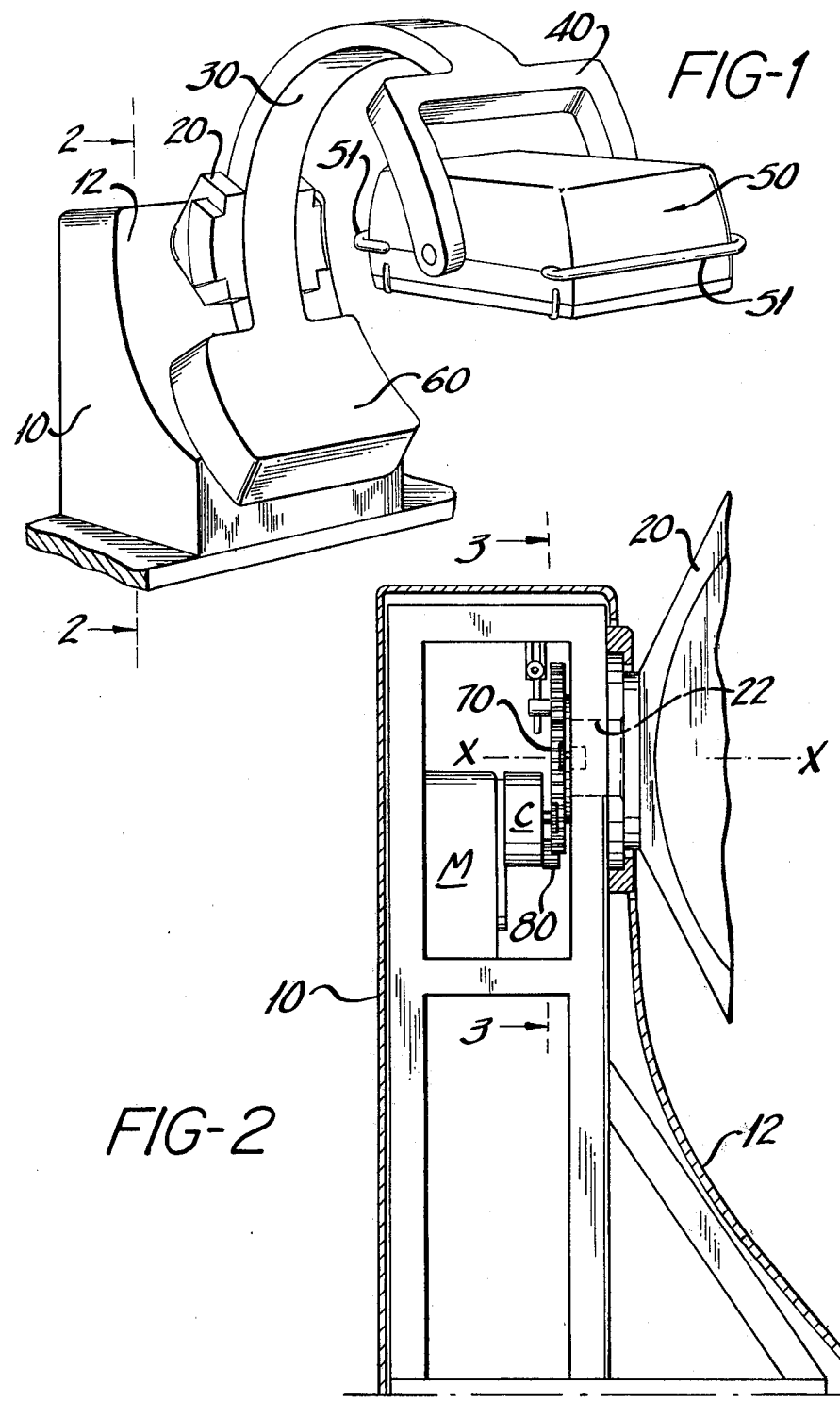

BRAKE ASSEMBLY FOR ROTATABLE SCINTILLATION DETECTOR

TECHNICAL FIELD

This invention relates to rotatable scintillation detectors such as those used in tomographic studies and more particularly to a brake mechanism for safely decelerating the rotating mass.

BACKGROUND OF THE INVENTION

Recent advances in the design of scintillation cameras have made scintillation cameras suitable for dynamic studies, such as tomographic studies. A scintillation camera, especially a wide field of view scintillation camera, such as would be expected to be used in dynamic studies is typically a very heavy device, on the order of several hundred pounds. Thus, whenever it is necessary to rotate a scintillation detector and its rotable support apparatus, a significant mass must be accelerated resulting in a rather substantial momentum. Traditional modes of braking the rotating apparatus, such as by applying a high frictional force, may result in damage to components of the system and hence are undesirable. Nonetheless, there is a need to safely decelerate the rotating apparatus subsequent to completion of a patient encircling orbit at some point beyond 360° and to do so in a fail-safe manner.

SUMMARY OF THE INVENTION

I have discovered a brake mechanism for a rotatable scintillation detector to safely and effectively slow down a rotating scintillation detector subsequent to the completion of a patient encircling orbit in either a clockwise or counterclockwise rotation. Moreover, my inventive brake mechanism provides a highly efficient utilization of the rotatable detector, in that the direction of rotation of each new orbit is counter to the one immediately preceding it, which provides convenient starting and stopping points for each rotation and ensures high throughput capability.

A brake mechanism is utilized in a curved beam apparatus which supports and rotates a scintillation detector of the type having a support such as a C-arm for supporting the scintillation detector at one end thereof. The C-arm is retained by a carrier member which is rotatable about its longitudinal axis for supporting the C-arm and scintillation detector during its orbital rotation about the longitudinal axis of the carrier member. The curved beam apparatus further includes a base member which supports the carrier member.

The brake mechanism permits the carrier member to make a complete revolution from a preselected starting position in either the clockwise or counterclockwise direction. The inventive brake mechanism comprises a striker member adapted for translational motion in a reciprocating fashion, a yoke or guide means disposed adjacent the striker member for defining the reciprocating path of the striker member, and a pair of dampening means such as shock absorbers for opposing the translational motion of said striker member and for tending to keep the striker member generally equidistant between said shock absorbers. The brake mechanism further comprises means for intermittently coupling the striker and carrier member such that the striker is advanced toward one of the shock absorbers to decelerate the rotated carrier member and to preclude the carrier member from traversing a second revolution in its direction of rotation. In a preferred embodiment, the carrier member of the curved beam apparatus is rotated by a motor driven gear which is provided with a striker pin arranged and configured to engage a tang protruding from said striker member as the gear completes a patient encircling orbit. The striker member is thus advanced toward one or the other shock absorber to decelerate the rotating apparatus.

In a preferred embodiment, the brake mechanism further comprises a pair of limit switches one of which is actuated whenever the striker member is deflected within the guide means beyond a preselected safety position. Whenever one of the limit switches is actuated, the motor driven gear is automatically disengaged to stop driving the rotating apparatus.

BRIEF DESCRIPTION OF THE DRAWINGS

FIG. 1 is a diagramatic perspective view of a scintillation detector adapted for tomographic studies of the type in which the present invention is utilized.

FIG. 2 is a section taken along line 2—2 of FIG. 1.

DETAILED DESCRIPTION OF THE INVENTION

Figure 3:
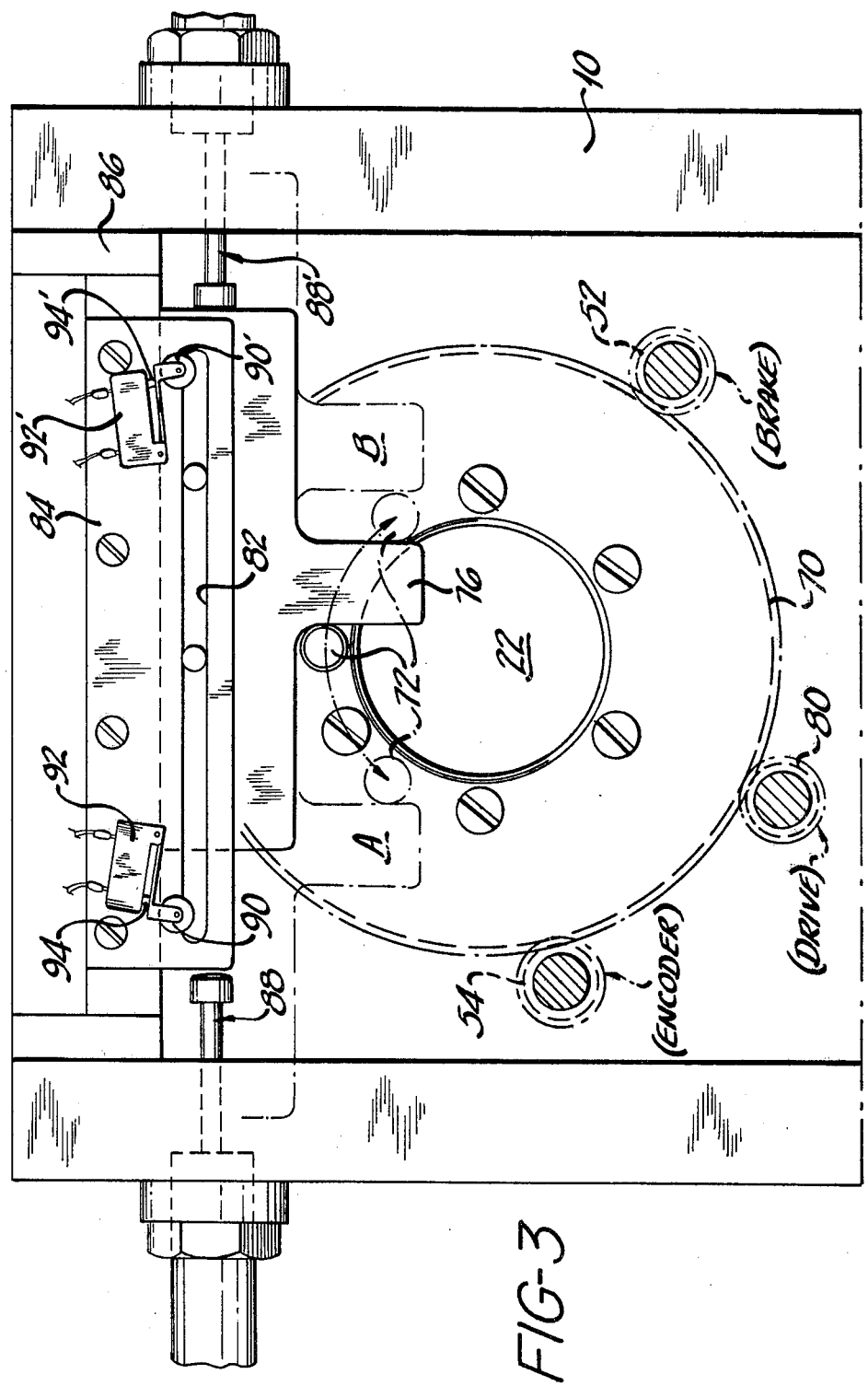
FIG. 3 is an enlarged schematic plan view taken along either line 3—3 of FIG. 2 or line 3—3 of FIG. 4 detailing the present invention.

Referring first to FIG. 1, there is shown a scintillation detector supported by a curved beam apparatus or scintillation detector stand. The curved beam apparatus comprises a base member 10 having a curved frontal portion 12. Attached to the base member 10 through the frontal portion 12 is a carrier member 20 having an axial opening 22 therein (see FIG. 3). As shown in FIGS. 2 and 4, the carrier member 20 is rotatable about axis x—x which defines the longitudinal axis of opening 22. Carrier member 20 has an arcuate portion outside of housing 10 which has a wide central groove therein for engaging a C-shaped support member or C-arm 30. One end of the C-arm 30 terminates in a yoke 40 to which a scintillation detector 50 is pivotally attached. The other end of the C-arm 30 terminates in a counterweight 60. C-arm 30 is moveable within carrier member 20 to permit scintillation detector 50 to be located to a desired starting position for a tomographic study requiring rotation of the scintillation detector about axis x—x by rotating carrier member 20. For additional detail of an apparatus of the type briefly described above, please refer to commonly assigned copending application Ser. No. 195,269, filed Oct. 8, 1980.

To perform tomographic studies, the scintillation detector 50 must make a complete orbit or revolution about a patient to acquire 360° worth of information necessary to reconstruct an image. More precisely, the scintillation detector 50 must orbit the patient slightly more than 360° to provide some overlap at the starting and ending points in order to ensure the acquisition of sufficient information to reconstruct a complete tomogram.

Figure 5:
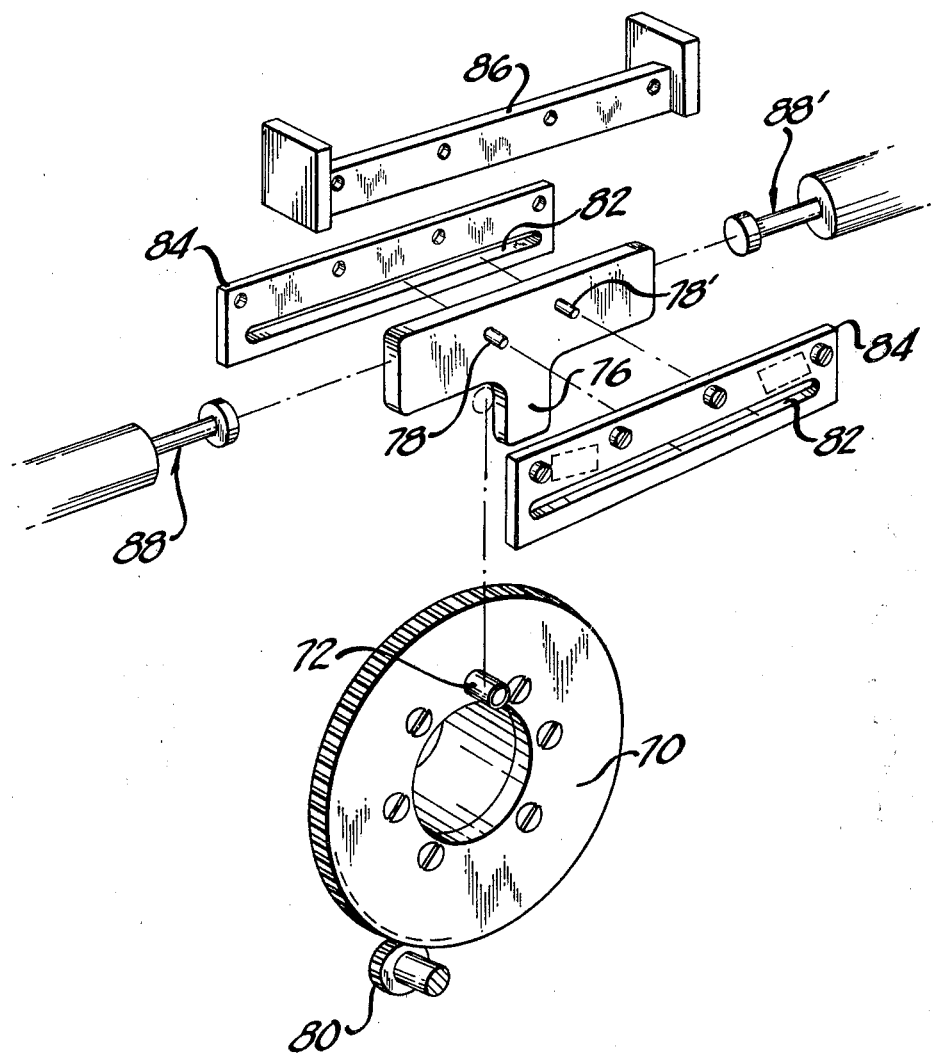
FIG. 5 is an exploded perspective illustrating the primary components of this invention as shown in FIG. 3.

A drive motor M and clutch assembly C is provided within base member 10 for use in tomographic studies. Carrier member 22 is rotated by a gear 70 which in turn is driven by drive gear 80. Protruding laterally from gear 70 is a striker pin 72 fixed to gear 70. As gear 70 rotates, striker pin 72 is arranged to contact a protruding tang member 76 of a striker 74. Striker 74 includes a pair of guide pins 78, 78' extending perpendicularly from either side of striker 74. The guide pins 78, 78' fit within opening 82 of each of a pair of guide means such as yokes or guide plates 84 that are provided on either side of striker 74. The guide plates 84 define the permissible range of movement of striker 74. One guide plate 84 is provided on either side of striker 74 as shown in the exploded view of FIG. 5, with both guide plates 84 mounted on support bracket 86, thereby providing striker 74 with the defined translational motion. Striker 74 tends to remain within the central portion of its permissible translational path by the opposing action of a pair of dampening means such as shock absorbers 88, 88'.

In the best mode contemplated by the applicant, each shock absorber is a small hydraulic shock absorber having a corrosion-inhibiting finish such as manufactured by Enidine Inc., having the following specifications:

NOMINAL INTERNAL COIL SPRING FORCES:
    EXTENDED 11 LBS.
    COLLAPSED 20 LBS.
STROKE: 2.00±0.38 INCHES
IMPACT VELOCITY: 4 IN./SEC.
ENERGY TO BE ABSORBED: 3380 IN.-LBS. WITH A DECELERATION OF 1.3 G's.

Striker 74 and shock absorbers 88, 88' are arranged so that when striker pin 72 is not contacting striker 74, generally one of the shock absorbers 88, 88' will tend to displace striker 74 toward the center of its translational path.

Figure 4:
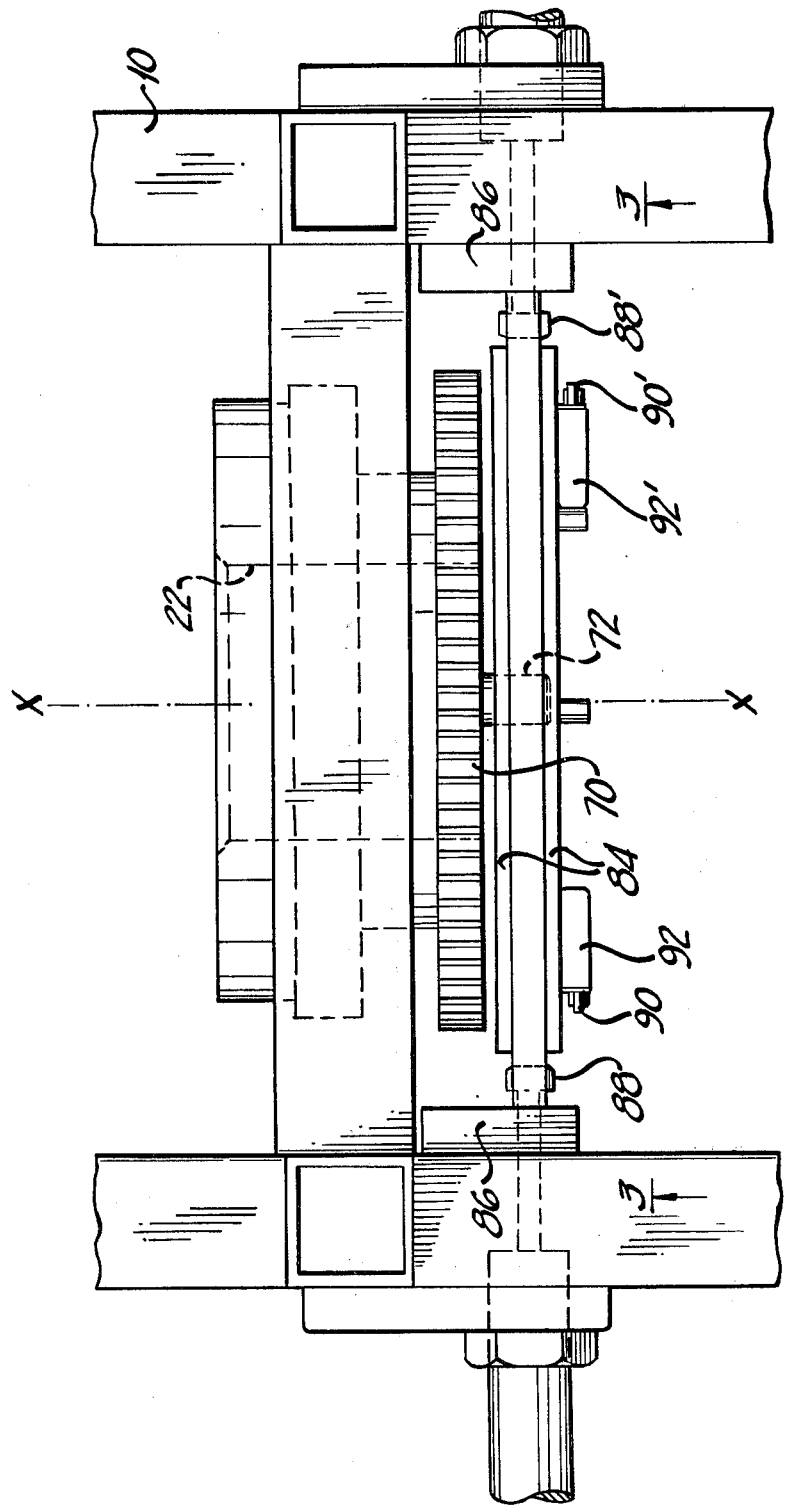
FIG. 4 is an enlarged detailed top view of the present invention.

To initiate a tomographic study, the scintillation detector 50 is moved to a starting location, typically corresponding to a vertical alignment of the C-arm 30 corresponding to the 12 o'clock position of striker pin 72, as shown in FIG. 3. To relocate scintillation detector 50, brake 52 must first be disengaged from gear 70. Disengagement of brake 52 is accomplished by operating one of the control bars 51 which are provided on scintillation detector 50. To begin rotation of carrier 20, gear 70 is driven by drive gear 80. A digital encoder 54 is also provided for computer controlled programming of the rotational orbit.

Assuming initially a counterclockwise rotation of gear 70 from the position depicted in FIG. 3, striker pin 72 will rotate away from tang member 76, thereby permitting striker 74 to be laterally displaced by shock absorber 88' toward shock absorber 88. Without the force of striker pin 72 on tang member 76, striker 74 will stabilize between the pair of extended shock absorbers 88 and 88'. As gear 70 completes its counterclockwise revolution, at aroung the 2 o'clock position, striker pin 72 will come into contact with the other side of tang member 76 and drive striker 74 along guides 84 against extended shock absorber 88. Against the impact of the momentum transmitted by striker pin 72, shock absorber 88 will begin to compress, thereby decelerating the rotating detector 50 and its support apparatus. If striker 74 is urged sufficiently toward shock absorber 88, pin 78 eventually will contact and displace limit switch pin 90 which actuates limit switch 92 by compressing button 94. Limit switch 92 is connected to drive motor M and will immediately upon actuation deenergize the motor M. Thus, actuation of limit switch 92 brings gear 70 to a stop, and will thereby preclude any attempt to further drive gear 70 in the counterclockwise direction. At this position, shock absorber 88 is almost fully compressed, tang member 76 is in position A, as shown in phantom in FIG. 3, and striker pin 72 is approximately in the 10 o'clock position.

From this furthermost counterclockwise orientation, another orbital rotation about a patient may be initiated with rotation this time in the clockwise direction. As gear 70 begins to rotate in the clockwise direction, striker pin 72 will rotate back past the 12 o'clock position permitting striker 74 to be advanced laterally by shock absorber 88 as striker pin 72 and striker 74 are decoupled. Striker 74 will once again be displaced towards the middle of its translational path situated between extended shock absorbers 88 and 88'. As gear 70 approaches completion of its clockwise rotation, pin 72 will contact tang member 76 at approximately the 10 o'clock position and begin to urge striker 74 toward shock absorber 88' (position B) which will serve to absorb the rotational momentum as shock absorber 88 did in connection with the counterclockwise rotation of gear 70. Similarly, guide pin 78' may displace limit switch pin 90' to actuate limit switch 92' once button 94' is deflected. The angular displacement of striker pin 72 and hence gear 70 past the 12 o'clock position is sufficient in either the clockwise or counterclockwise direction to permit the necessary overlap beyond the 360° of rotation on each pass to ensure the acquisition of sufficient information to permit the reconstruction of a complete tomogram.

Alternatively, the scintillation detector 50 may be rotated manually without power from motor M and with drive gear 80 disengaged. Manual operation is also initiated by the operator disengaging brake 52 by squeezing one of the control bars 51. With drive gear 80 disengaged, limit switches 92 and 92' are ineffective so that the sole means for decelerating the rotating mass is provided by either shock absorber 88 or 88'.

I claim:

1. In a curved beam apparatus for supporting a rotating scintillation detector of the type having a support arm for supporting the scintillation detector, a carrier member rotatable about its longitudinal axis for retaining the support arm permitting the support arm and scintillation detector to orbit about the longitudinal axis of the carrier member, and a base member for supporting the support arm, a brake mechanism which permits the carrier member to make a complete revolution from a preselected starting position in either clockwise or counterclockwise direction before impeding further travel in said direction, said brake mechanism comprising:

(a) a reciprocating striker member;
(b) guide means disposed adjacent said striker member for defining its reciprocating path;
(c) a pair of dampening means for opposing the reciprocating motion of said striker member and for positionally biasing said striker member; and
(d) means for intermittently coupling said striker member and carrier member such that during an orbit of the detector, said striker member is advanced toward one of said dampening means to decelerate said rotated carrier member and preclude the carrier member from traversing a second revolution in its direction of rotation.

2. A brake mechanism according to claim 1 wherein each of said dampening means is a hydraulic shock absorber.

3. A brake mechanism according to claim 1 wherein said means for coupling said striker member and carrier member includes a gear attached to said carrier member, said gear having a pin fixed thereto for rotation therewith; and said striker member having a tang member configured to contact said pin of said gear during any complete 360° rotation thereof.

4. A brake mechanism according to claim 1 further comprising means for stopping rotation of said detector at a preselected angular orientation subsequent to a complete revolution.

5. A brake mechanism according to claim 4 further comprising a motor driven gear attached to said carrier member, said gear having a striker pin fixed thereto for rotation therewith, said striker member having a tang member extending therefrom in a common plane therewith configured to contact said striker pin during any complete 360° rotation of said gear.

6. A brake mechanism according to claim 5 wherein said means for stopping said rotation comprises a limit switch actuatable by said striker member whenever said striker member is moved to a preselected position within said guide means.

7. A brake mechanism according to claim 6 wherein said limit switch is electronically connected to said motor driven gear, said limit switch being actuatable by said striker member whenever said striker member is translated beyond a preselected position relative to the center of said guide means such that whenever said carrier member is motor driven and said limit switch is actuated, the drive gear is deenergized to stop the rotated detector.

8. In a rotatable scintillation detector for orbiting about a patient, a brake mechanism which permits the detector to make a complete revolution from a preselected starting position in either clockwise or counterclockwise direction before impeding further rotation in said direction, said brake mechanism comprising:
  (a) a movable striker member;
  (b) guide means disposed adjacent said striker member for defining a translational path of movement of said striker member;
  (c) a pair of shock absorbers for opposing the translation of said striker member and for positionally biasing said striker member between said shock absorbers;
  (d) means for rotating said detector; and
  (e) means for intermittently coupling said striker member and said means for rotating said detector such that during each orbit of the detector said striker member is advanced toward one of said shock absorbers to decelerate the rotated detector and to preclude the detector from traversing a second orbit about the patient in its direction of rotation.

* * * * *